Dec. 3, 1968   M. KAUFMANN   3,413,810
FUEL INJECTION DEVICE FOR LIQUID FUEL ROCKET ENGINES
Filed May 13, 1966   5 Sheets-Sheet 1
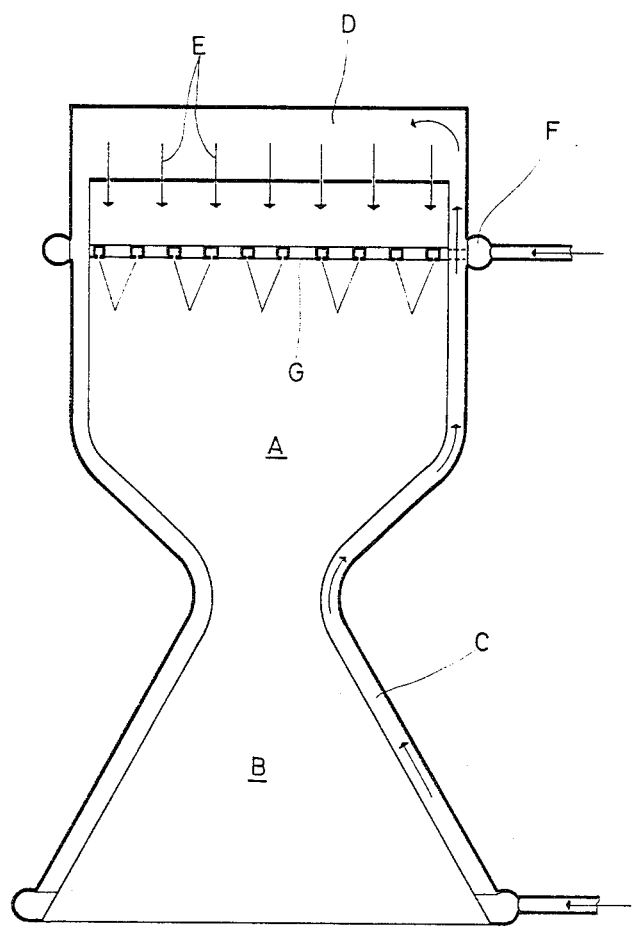
INVENTOR
Michael Kaufmann

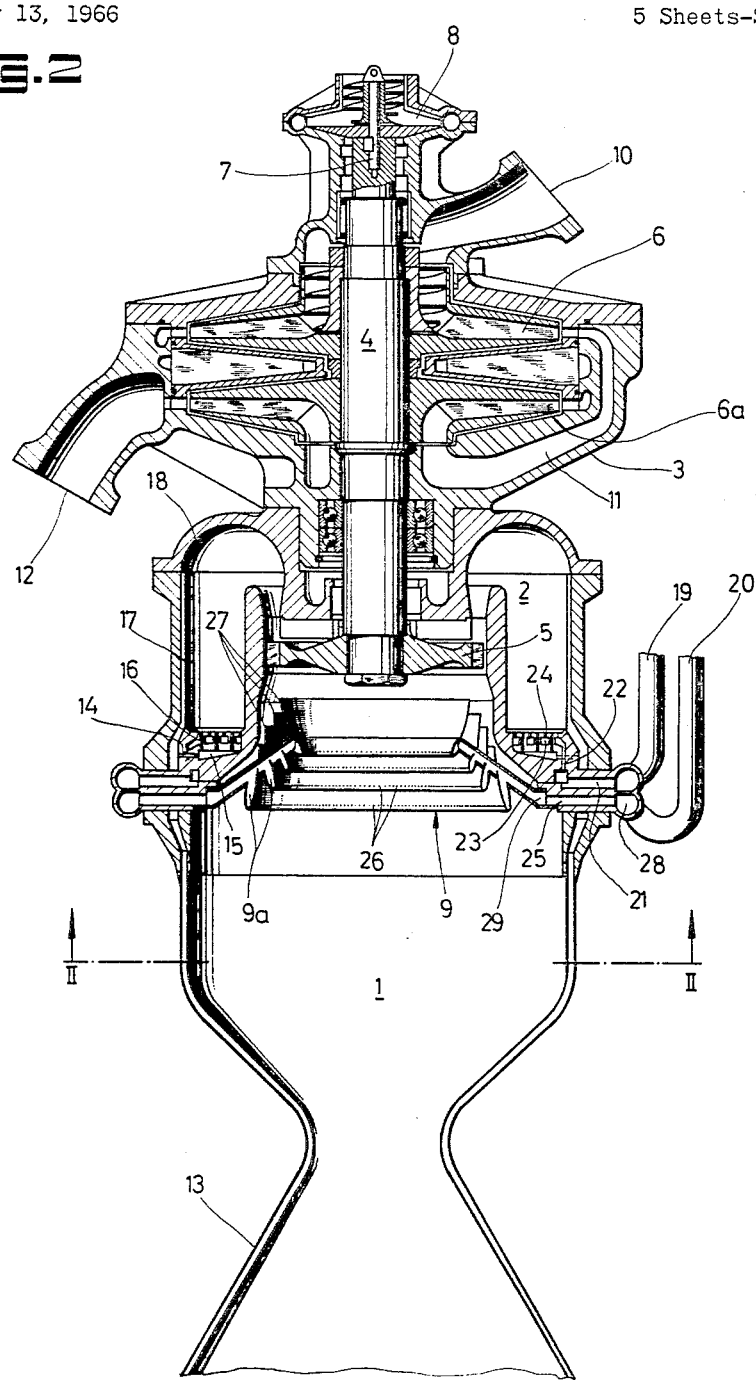

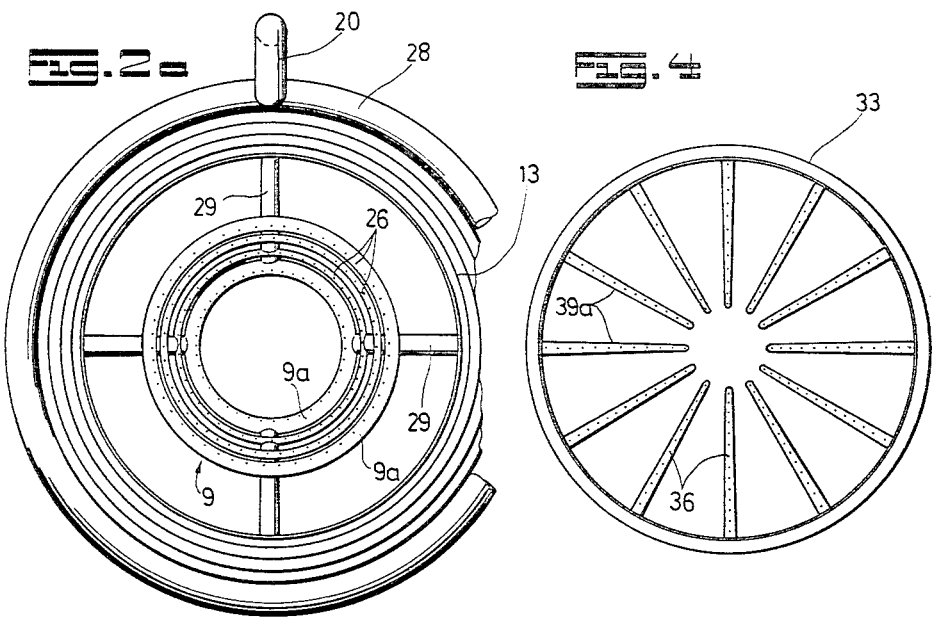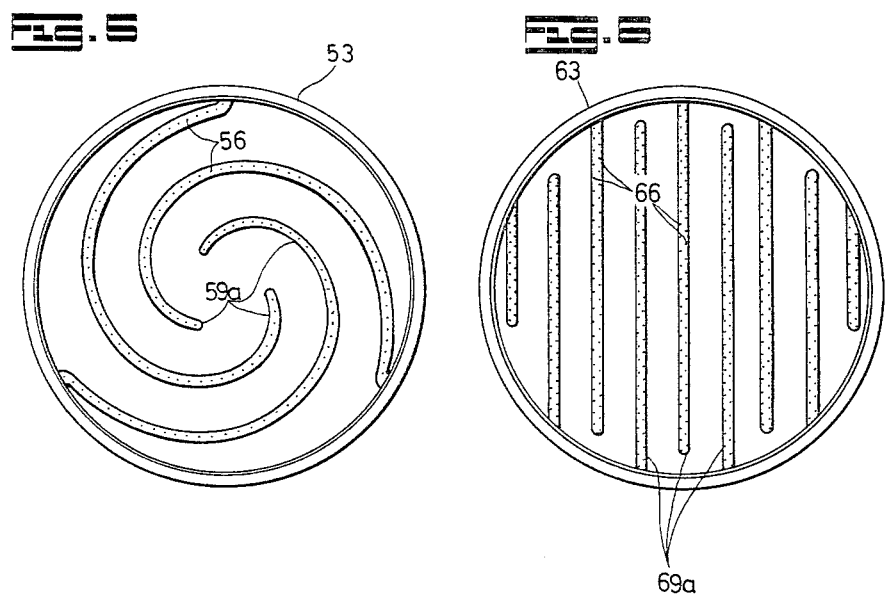

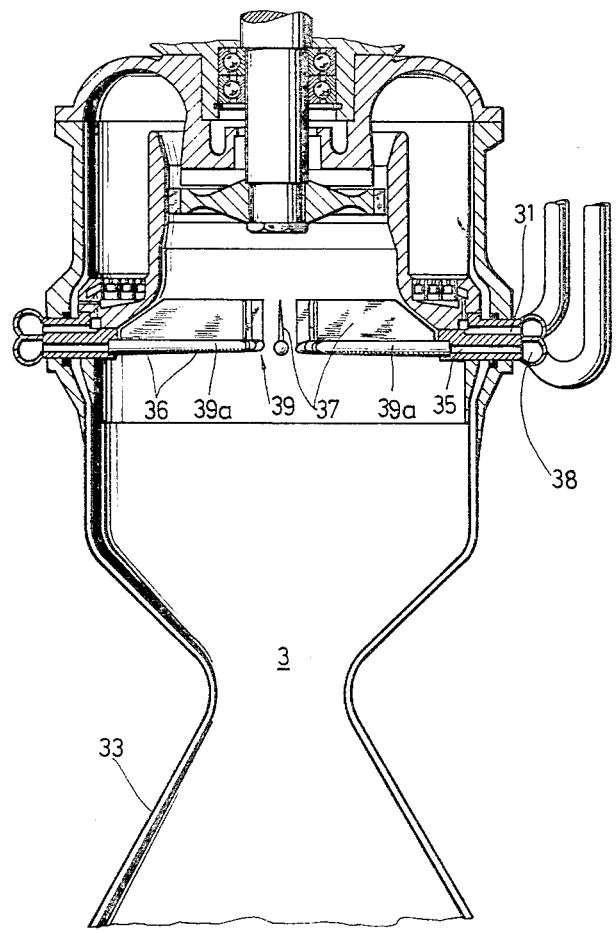

Dec. 3, 1968  M. KAUFMANN  3,413,810
FUEL INJECTION DEVICE FOR LIQUID FUEL ROCKET ENGINES
Filed May 13, 1966  5 Sheets-Sheet 5
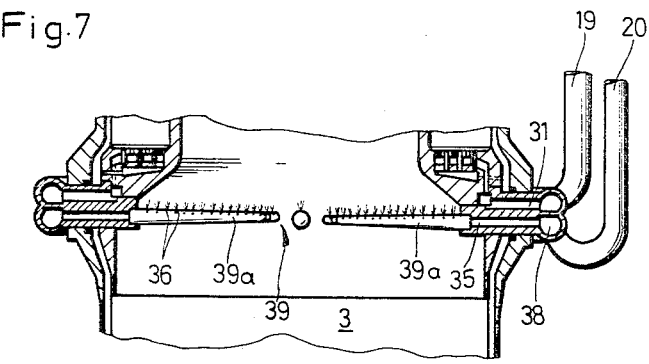
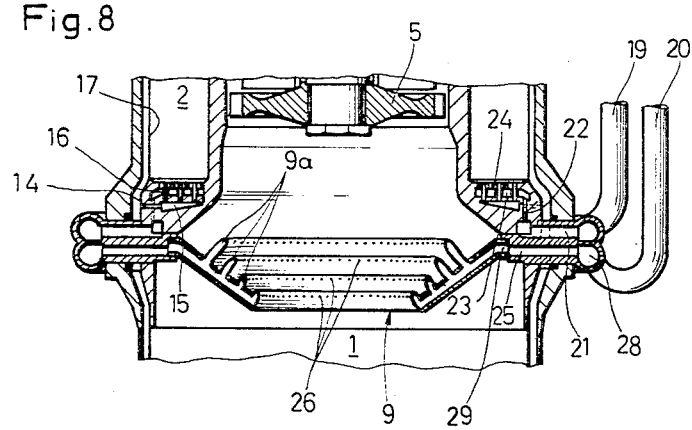
INVENTOR
Michael Kaufmann
BY
McGlew & Toren
ATTORNEYS United States Patent Office 3,413,810
Patented Dec. 3, 1968

3,413,810
FUEL INJECTION DEVICE FOR LIQUID FUEL ROCKET ENGINES
Michael Kaufmann, Neubiberg, Germany, assignor to Bolkow Gesellschaft mit beschrankter Haftung, Ottobrunn, near Munich, Germany
Filed May 13, 1966, Ser. No. 550,034
Claims priority, application Germany, May 15, 1965, B 81,947
14 Claims. (Cl. 60—258)

ABSTRACT OF THE DISCLOSURE

A rocket engine is disclosed as of the type supplied with combustible mixture components in liquid form and having a combustion chamber into which at least one component or an incompletely burned mixture of plural components is delivered as a gaseous stream. The combustion chamber includes an injection device injecting at least one other component, preferably still in liquid form, into the gaseous stream. The injection device comprises plural fixed component-supply lines arranged in the form of a small mesh lattice extending across the combustion chamber and the flow path of the gaseous stream. These supply lines have small cross sections whereby not to interfere with the flow of the gaseous stream from a precombustion chamber into the main combustion chamber, the supply lines having component injection orifices and presenting substantially no resistance to the flow of the gaseous stream therethrough toward a nozzle, while preventing any turbulence or backflow of the products of combustion.

Background of the invention

This invention relates to rocket engines wherein the components of the combustible mixture are supplied in liquid form and, more particularly, to a rocket engine of this type including a precombustion chamber and a main combustion chamber and a novel injection device forming the upstream limitation of the combustion space of the main combustion chamber and arranged to introduce a combustible mixture component into a gaseous current flowing from the precombustion chamber into the main combustion chamber and including at least one combustible mixture component or an incompletely burned mixture of several combustible mixture components.

In many rocket engines, one of the combustible mixture components is first conducted through a cooling system before it enters the combustion chamber in which it is substantially completely evaporated. A known procedure is to inject the resulting vaporized component, through a single injection bottom wall into the combustion chamber. This results in inefficient use of the liquid combustible mixture components since they are only insufficiently atomized by the gaseous current. The collision or impact of a liquid component and a gaseous component, furthermore, is not so effective as that of the collision or impact of two liquid combustible mixture components.

In another type of rocket engine, a fuel component of the combustible mixture is incompletely oxidized in a precombustion chamber. The resulting combustion gases flow through a turbine in a main combustion chamber. In the main combustion chamber, the additional amount of combustible mixture components required for complete combustion is injected, primarily in a liquid state. A known technique is to inject this additional amount through orifices in a cylindrical or conically diverging combustion chamber wall downstream of the turbine.

In this latter case, the mixing and combustion zone is greatly elongated, since the additional amount of combustible mixture components is injected from the exterior inwardly against a more or less self-contained gas current leaving the turbine. The long combustion zones require long combustion chambers, as the combustion efficiency is very low with a short combustion chamber. Additionally, the turbine rotor is exposed to a high thermal load due to the radiant heat and the return flow of completely oxidized combustible mixture, so that either it must be shielded by a protective heat shield or it must be cooled.

It is already known to avoid these thermal influences by arranging the turbine and the fuel pumps on a rotor disk, and injecting the additional mixture portions directly from the rotor, rotating at high speed, into the main combustion chamber. This expedient insures effective cooling of the pump-turbine unit, but it presents significant problems with respect to sealing, and this leads to undue complication of the parts. In this case, as in the cases mentioned above, adequate mixing of the components cannot be attained since the added liquid components impinge only on the inner surface of the hollow gas column.

An object of the present invention is to improve the combustion efficiency in engines of the above-mentioned type, by intensive mixing of the combustible mixture components and distribution of the burning gases over the entire cross section of the main combustion chamber.

Another object of the invention is to improve the combustion efficiency, in the manner just described, and using a combustion chamber having a reduced length.

A further object of the invention is to provide a novel means of protecting the turbine in such engines, where the turbine is arranged at the upstream end of the combustion chamber, against thermal influences emanating from the combustion chamber.

Yet another object of the invention is to provide, in engines of the above-mentioned type, an injection device for the additional combustible mixture component and which consists of fuel supply lines arranged in the form of a lattice and provided with injection orifices, with the mesh apertures of the lattice being so selected that the hot burning gases can pass through the lattice without any significant flow resistance.

With this arrangement, the stream of hot burning gases entering the main combustion chamber is divided by the lattice into different individual currents which, taken together, have a larger surface than a single self-contained gas current. The individual gas currents are guided along the injection orifices by the lattice itself, so that the large surface of the latter is utilized as far as possible to promote the combustion reaction. In turn, this results in a desirable substantial decrease in the length of the combustion zone.

The lattice also provides a guiding effect in that the flow downstream of the injection device is uniform and unidirectional. This guiding effect thus prevents the hot gases from flowing in a reverse direction, and this is particularly important in the case where a turbine is arranged at the upstream end of the main combustion chamber. Furthermore, the lattice, in cooperation with the injected liquid component flowing through its fuel lines, has the effect of shielding all parts arranged upstream of the lattice against radiant heat from the main combustion chamber.

The injection lattice can be designed in various ways. For example, and in accordance with one embodiment of the invention, the lattice can consist of several concentric rings, each constituted by a liquid component supply line, these rings being of different size and connected with each other by radially extending spokes which serve as feed lines. In another embodiment of the invention, the injection device can comprise individual supply lines extending radially inwardly. In a further embodiment, the lattice can comprise individual supply lines arranged in the form of one or more combs, and in still another embodiment, the lattice can comprise component injection lines arranged as spirals. These various forms achieve different injection patterns, but represent only a few examples of possible embodiments of the principles of the invention.

In accordance with the invention, the liquid component supply lines forming the injection device may be arranged in a common plane, which results in a simple construction. However, the supply lines also can be arranged in a basket-shaped configuration facing either toward or away from the nozzle end of the engine and, with this arrangement, it is possible to control or influence the flame front. By the term "basket-shaped configuration" is meant an arrangement wherein the supply lines are annular and are progressively increasing diameter in one axial direction, the supply lines being offset axially from each other and being concentric.

A desirable feature of the invention is the provision of guide vanes extending at least partly along the component supply lines of the injection device and toward the upstream side. By this feature, the inherent guiding and flow straightening effect of the lattice can be considerably improved so that it is possible to obtain a flame extending across the entire cross section of the combustion chamber. An equally advantageous effect can be obtained by designing the supply lines of the injection device with a favorable flow cross section or profile for the gas streams and which profiles or cross sections are arranged at a selected angle to the flow of gas. The injection orifices can discharge either in the direction of gas flow or in opposition to the direction of gas flow, and may also be arranged to discharge at any desired angle to the direction of gas flow.

The mesh aperture of the injection device, the cross section of the component supply lines, and the number and distribution of the injection orifices can be determined mathematically in their order of magnitude, and the optimum design can best be obtained by tests for different engines.

Preferably, the injection orifices are arranged symmetrically with respect to the axis of the combustion chamber, and the supply lines of the injection lattice are all closed end ducts suitable for carrying combustible mixture components independently of the manner in which they are manufactured and of their inner structure.

For an understanding of the principles of the invention, reference is made to the following description of typical embodiments thereof as illustrated in the accompanying drawings.

In the drawings:

FIG. 1 is a somewhat schematic longitudinal or axial sectional view through an engine embodying the invention, and with a component of the combustible mixture being evaporated in cooling ducts;

FIG. 2 is an axial cross sectional view of an engine embodying the invention, and provided with a turbine and with an injection device, in accordance with the invention, in a basket-shaped configuration;

FIG. 2a is a transverse sectional view taken on the line II—II of FIG. 2;

FIG. 3 is a view similar to FIG. 2 partially illustrating an engine provided with a different form of lattice injection device, in accordance with the invention, and arranged in a plane;

FIG. 4 is a plan view of the lattice injection device of FIG. 3;

FIG. 5 and FIG. 6 are views, similar to FIG. 4, illustrating alternative arrangements of the fuel supply lines of the lattice injection device;

FIG. 7 is a view, similar to FIG. 3, illustrating an alternative arrangement of the injection device of FIG. 3; and FIG. 8 is a view, similar to a portion of FIG. 2, illustrating an alternative arrangement of the injection device of FIG. 2.

The rocket engine shown somewhat schematically in FIG. 1 is designed for regenerative cooling, with one of the combustible mixture components being supplied through cooling ducts and evaporated therein. The other portion of the combustible mixture, which is not used for such cooling, is injected through a lattice injection device into the component evaporated in the cooling ducts.

Referring more particularly to FIG. 1, the coolant enters the cooling system C at the nozzle end of the rocket engine, this cooling system surrounding the main combustion chamber A and the nozzle B. The coolant, which is essentially evaporated in the cooling system C, accumulates in a collecting chamber D. From chamber D, the evaporated coolant which is initially a liquid component of the combustible mixture, is discharged through injection orifices E into combustion chamber A. In combustion chamber A, the gaseous or vaporous stream flows through the meshes of a lattice-type injection device G. In the plane of lattice G, and downstream thereof, the gaseous or vaporous fuel component flowing through the lattice G burns with the combustible mixture component injected thereinto by means of the lattice injection device G.

FIG. 2 illustrates a rocket engine supplied with liquid oxygen and liquid hydrogen. The principal parts of the rocket engine shown in FIG. 2 are a main combustion chamber 1 formed with a convergent-divergent nozzle extending downstream thereof, and an annular pre-combustion chamber 2 arranged upstream of main combustion chamber 1. The rocket engine further includes a pump housing 3 having an inlet or suction nipple and a discharge or pressure nipple. Housing 3 mounts a shaft 4 supported on a pair of axially spaced bearings in housing 3, and shaft 4 has fived thereto a turbine rotor 5, a two-stage hydrogen pump rotor 6, 6a, and an oxygen pump rotor 8 carried on a small shaft 7 plugged into the axially outer end of shaft 4. The upstream end of main combustion chamber 1, which is the end remote from the discharge nozzle of the rocket engine, is delimited by an injection device 9 in accordance with the invention. Injection device 9, as best seen in FIGS. 2 and 2a, comprises concentric annular fuel supply lines 9a and radially arranged fuel feed lines 29, these lines 9a and 29 being arranged in a basket-shaped configuration.

The liquid fuel, such as liquid hydrogen, flows from a tank (not shown) through the inlet or suction nipple 10 into the pump having the rotor 6, and from there through a bypass 11 into the second stage pump having the rotor 6a. From the second stage, the liquid fuel is discharged through pressure nipple 12 into the cooling system 13 of the main combustion chamber, by conventional connections which have not been illustrated.

The entire supply of hydrogen, which is now vaporous due to passage through the cooling system 13, is supplied to the pre-combustion chamber 2. A part flows through ducts 14 into an annular chamber 15 and from chamber 15 through apertures 16 into the pre-combustion chamber where it burns with oxygen. Another part of the vaporous hydrogen is conducted, for cooling purposes, between the wall of precombustion chamber 2 and a sheet metal jacket 17, such as a sheet iron jacket. From the cooling space defined by the wall of the precombustion chamber 2 and jacket 17, this portion of the hydrogen supply flows through an annular slot 18 into the pre-combustion chamber wherein it mixes with the burning fuel to form the combustible mixture for driving the turbine.

The liquid oxygen is supplied from a tank (not shown) to the pump having the rotor 8, and flows from this pump through a distributor (not shown) into two lines 19 and 20. From the line 19, the portion of the oxygen required for combustion flows through conduits or passages 21 and 22 into the oxygen chamber 23 of the injection head of the precombustion chamber 2. This portion of the oxygen supply is injected into the combustion zone through orifices 24. The remainder of the oxygen supply flows from line 20 into the annular distributor ring 28 and from thence through ducts 25 and the radial feed lines 29 directly into the concentric annular supply lines 9a of the injection device or lattice 9.

The hot gases from the precombustion chamber provide the power necessary for driving the turbine-pump unit, and leave the turbine with twist and turbulence. This gas flow is divided by the injection lattice 9, acting as a stream guiding and straightening device, into individual gas currents which are straightened and passed by the injection orifices 26. These orifices 26 can discharge in a direction toward each other, to obtain a more intensive mixing of the combustible mixture components, by virtue of two discharged jets colliding.

An increase in the guiding and straightening function of the annular supply lines 9a can be effected by baffle plates 27 arranged on the upstream sides of the lines 9a. The individual gas currents have a much larger reaction surface, compared to the single compact gas current, so that a more intensive combustion is obtained. Due to the guiding effect of the lattice injection device 9, the burning gases spread over the entire cross section of combustion chamber 1.

FIG. 2a shows the arrangement of the injection device 9 in plan and, as can be seen from FIG. 2a, the concentric supply lines 9a are interconnected by four radially extending spoke-type feed lines 29. However, the invention is by no means limited to a particular number of feed lines 29. Furthermore, the lattice injection device 9 may be arranged, alternatively, to inject the fuel in a direction away from the nozzle end, as shown in FIG. 8.

In FIG. 3, where the rocket engine parts are identical with the same parts of the rocket engine of FIG. 2, reference characters have been omitted. Referring to FIG. 3, the lattice injection device 39 comprises individual relatively elongated conical pipes 39a which extend radially inwardly toward each other and are rectilinear. The outer ends of pipes 39a are connected through conduits 35 to a distributor ring 38. Plates 37 extend along the upstream side of each pipe and, in the same manner as described for FIG. 2, serve as guiding means for the turbulent and whirling gas current. The injection device 39 of FIG. 3 is installed in diametric plane which is perpendicular to the gas flow direction. However, this is shown by way of example only as, in an equally advantageous manner, the supply lines can be oblique to a diametric plane and face either toward or away from the nozzle end. Alternatively, they may have any other expedient mutual arrangement. FIG. 7 illustrates an arrangement wherein the lattice injection device 39 faces away from the nozzle end.

Each of the supply lines illustrated in FIGS. 4, 5 and 6, is essentially closed at its inner end projecting into the combustion chamber so that an increased injection pressure can build up. However, in order to insure cooling by a constantly flowing combustible mixture component, one or more injection orifices are provided at the extreme inner end of each line. Furthermore, the lines shown in FIGS. 4, 5 and 6 have a profile or cross section which favors flow of the gas stream thereover.

Referring to FIGS. 4, 5 and 6, FIG. 4 illustrates the injection device 39 of FIG. 3, as seen in plan view from the nozzle end. Supply lines 39a are distributed uniformly around the circumference of the combustion chamber and extend nearly to the axis of the chamber so that there is no large gap in the lattice 39. The injection orifices 36 are arranged on a generatrix so that they point in the direction of the gas current flow.

FIG. 5 illustrates another embodiment of the injection device, being a plan view the same as FIG. 4. In the embodiment of FIG. 5, several supply lines 59a, illustrated solely by way of example as three lines, extend from the combustion chamber wall, where they are connected to a distributor ring 53, and spiral inwardly. By this arrangement, a dense lattice can be attained with a relatively few supply lines.

FIG. 6 is a view similar to FIG. 4, but illustrating a further embodiment of the lattice injection device. In FIG. 6, the supply lines 69a form two oppositely directed comb-shaped systems whose teeth intermesh with each other. The injection orifices 66 are arranged, for example, on two generatices spaced from each other in such a manner that the discharges from two jets on adjacent lines intersect or collide.

The supply lines of the above-described injection system, which are connected only at one end to a distributor ring outside the combustion chamber with the other end extending into the combustion chamber, as shown in FIGS. 4, 5 and 6, are essentially closed at their inner ends so that an increased injection pressure can build up. However, in order to cool the supply lines by constantly flowing liquid component, injection orifices are provided in the inner ends also.

While specific embodiments of the invention have been shown and described in detail to illustrate the application of the principles of the invention, it will be understood that the invention may be embodied otherwise without departing from such principles.

What is claimed is:

1. In a rocket engine of the type supplied with combustible mixture components in liquid form, and having combustion chamber means into which at least one component or an incompletely burned mixture of plural components is delivered as a gaseous stream, the combustion chamber means including a main combustion chamber which is substantially cylindrical and has a substantially circular cross section and a substantially uninterrupted inner peripheral wall, a convergent-divergent nozzle at the outlet end of the main combustion chamber through which gaseous products of combustion from the main combustion chamber are discharged, a precombustion chamber upstream of the main combustion chamber with respect to the direction of flow of the gaseous stream, a turbine at least partly separating the main combustion and the precombustion chamber, a pump driven by the turbine, means supplying a first component of the combustible mixture to the pump, means supplying a second component of the combustible mixture to the main combustion chamber, and means supplying the first component in vaporized form to the precombustion chamber, the main combustion chamber including an injection device injecting at least the second component, preferably still in liquid form, into the gaseous stream; the improvement in which said injection device comprises plural fixed component-supply lines arranged in the form of a lattice extending across the main combustion chamber and the flow of the gaseous stream; said supply lines having component injection orifices and being arranged to define relatively small lattice mesh apertures presenting substantially no resistance to the flow of the gaseous stream therethrough toward the nozzle while inhibiting return flow of the gaseous stream; said supply lines having relatively small cross sections facilitating the flow of the gaseous stream thereover, and being arranged in relatively closely adjacent relation; said injection device forming the upstream limitation of the combustion space of the main combustion chamber.

2. in a rocket engine, the improvement claimed in claim 1, in which said lattice injection device is installed in a plane which is perpendicular to the flow direction of said gaseous stream.

3. In a rocket engine, the improvement claimed in claim 1, in which said lattice comprises plural annular concentric component-supply lines interconnected by radially extending component-supply lines acting as feed lines to said annular supply lines.

4. In a rocket engine, the improvement claimed in claim 1, in which said lattice injection device comprises plural individual component-supply lines extending radially inwardly from the periphery of said combustion chamber toward the axis thereof and spaced substantially uniformly circumferentially of said combustion chamber.

5. In a rocket engine, the improvement claimed in claim 1, in which said lattice injection device comprises at least one component-supply line formed as a spiral extending inwardly from the periphery of said combustion chamber.

6. In a rocket engine, the improvement claimed in claim 1, in which said lattice injection device comprises plural component-supply lines arranged as the teeth of two comb-shaped line systems extending toward each other, with the teeth of one system extending between the teeth of the other system.

7. In a rocket engine, the improvement claimed in claim 1, in which said plural component-supply lines are arranged in a single plane.

8. In a rocket engine, the improvement claimed in claim 1, in which the component-supply lines of said lattice injection device are arranged in a basket-shaped configuration opening toward the discharge end of said combustion chamber.

9. In a rocket engine, the improvement claimed in claim 1, in which the component-supply lines of said lattice injection device are arranged in a basket-shaped configuration opening toward the inlet end of said combustion chamber.

10. In a rocket engine, the improvement claimed in claim 1, including flow guiding means each extending along at least part of the length of a respective component-supply line and upstream of the direction of flow of said gaseous stream.

11. In a rocket engine, the improvement claimed in claim 10, in which said guide means comprise vanes.

12. In a rocket engine, the improvement claimed in claim 1, in which said injection orifices discharge in the direction of flow of said gaseous stream.

13. In a rocket engine, the improvement claimed in claim 1, in which said injection orifices discharge in a direction upstream of the flow direction of said gaseous streams.

14. In a rocket engine, the improvement claimed in claim 1, in which said injection orifices discharge in a direction at a selected angle with respect to the flow direction of said gaseous stream.

References Cited

UNITED STATES PATENTS

| | | | |
|---|---|---|---|
| 2,672,011 | 3/1954 | Von Zborowski | 60—39.74 |
| 2,729,059 | 1/1956 | Fouré | 60—39.74 |
| 2,780,916 | 2/1957 | Collins | 60—39.72 |
| 2,787,120 | 4/1957 | Leduc | 60—39.74 |
| 2,944,388 | 7/1960 | Bayer | 60—261 |
| 3,046,731 | 7/1962 | Cambel | 60—261 |
| 3,091,921 | 6/1963 | Youngquist | 60—39.46 |
| 3,232,048 | 2/1966 | Stockel | 60—261 |
| 3,286,473 | 11/1966 | Cowell | 60—258 |

FOREIGN PATENTS

| | | |
|---|---|---|
| 228,976 | 5/1959 | Australia. |
| 802,428 | 10/1958 | Great Britain. |

MARTIN P. SCHWADRON, *Primary Examiner.*

DOUGLAS HART, *Assistant Examiner.*